Figure 1:
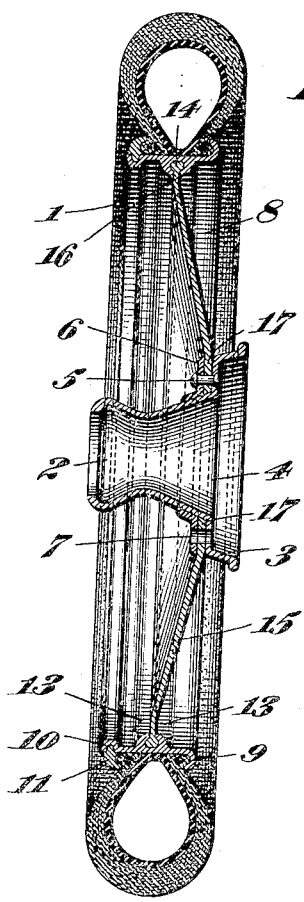

E. E. SLICK.
WHEEL.
APPLICATION FILED NOV. 22, 1918.

1,377,634.

Patented May 10, 1921.

Inventor
Edwin E. Slick.
Geo. E. Thackray
Attorney

UNITED STATES PATENT OFFICE.

EDWIN E. SLICK, OF WESTMONT BOROUGH, PENNSYLVANIA.

WHEEL.

1,377,634.          Specification of Letters Patent.     Patented May 10, 1921.

Application filed November 22, 1918. Serial No. 263,724.

*To all whom it may concern:*

Be it known that I, EDWIN E. SLICK, a citizen of the United States, and a resident of the borough of Westmont, county of Cambria, and State of Pennsylvania, (whose post-office address is Johnstown, Pennsylvania,) have invented certain new and useful Improvements in Wheels; and I do hereby declare the following to be a full, clear, and exact description of the invention, such as will enable others skilled in the art to which it appertains to make and use the same.

My invention relates to certain improvements in wheels with particular reference to those of the demountable type used for automobiles, auto-trucks and other vehicles My wheel consists generally of a hub portion which may be of the demountable type adapted to be put on or taken off an inner hub on the vehicle of the character described and also provided with means for securing the same in place on said inner hub. To this hub I secure a metal plate disk which may be flat or dished and secured to the hub by riveting, bolting, welding or otherwise, and on the outer edge of this disk I provide an enlargement, protuberance or flange adapted to interlock with integral flanges or projections on the rim portion. The rim, which may be of comparatively thin metal, may be formed with one or more marginal hook portions to retain a clencher tire or it may be formed with outwardly curving portions to retain a straight-side tire, or it may be provided with any of the usual tire-shoe engaging constructions.

One of the essential features of my invention resides in providing inwardly projecting flange-portions on the inner surface of the rim, one or both of which are adapted to be bent down and securely clamped over the circumferential protuberance or flange of the web of the disk. In some cases I provide two flanges on the rim both of which are bent or rolled down to close contact with the protuberance or flange on the outer circumference of the disk, but in other cases I may provide a much smaller flange on one side and a longer one on the other side, whereby the rim is adapted to be slipped over the disk with ease from the side provided with the smaller flange, and the other flange can be as long as necessary to provide ample metal for bending down and locking the disk to the rim. In cases where I use two downwardly projecting flanges I may first heat the rim to expand it so that one of the flanges passes over the edge of the disk, or I may make the rim of diameter sufficient so that it can be placed over the rim and then by radial or circumferential pressures or both I may upset the rim when placed in position over the disk until it becomes of smaller diameter and is securely clamped or bent thereon, after which the flanges are bent or rolled down to contact with the protuberance or flange on the edge of the disk, thereby practically integrally uniting the structure. I may also expand the disk to fit the rim.

Having thus given a general description of my invention, I will now, in order to make the matter more clear, refer to the annexed sheet of drawings in which like characters denote like parts:—

Figure 2:
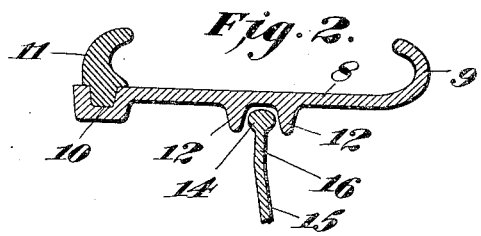
Figure 3:
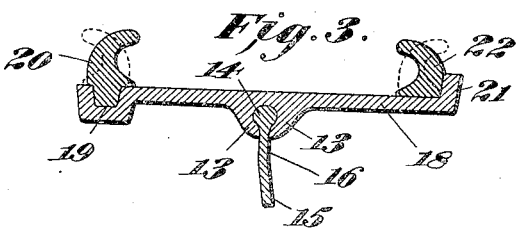

Figure 1 is a transverse sectional elevation of a wheel constructed in accordance with my invention; Fig. 2 is a transverse section of a rim and adjacent portion of the disk, this rim being provided with two flanges and the disk with a rounded protuberance on its edge, this figure illustrating the shape of the rim as first manufactured and rolled. Fig. 3 is a view showing flanges similar to those of Fig. 2 rolled down over the edge of the protuberance of the disk after the rim has been placed over and contracted upon the same.

Figure 4:
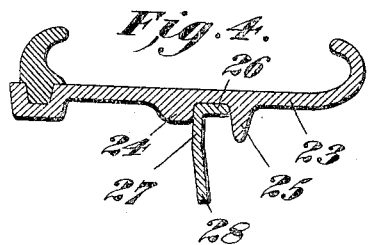
Figure 5:
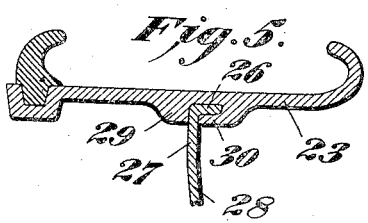
Figure 7:
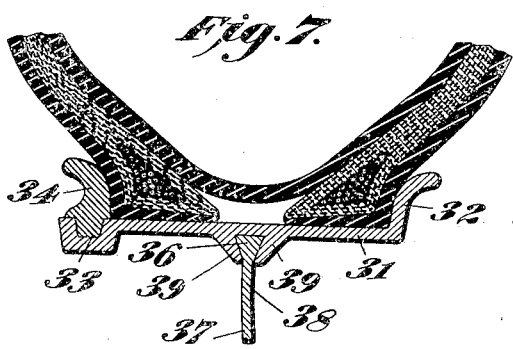
Figure 6:
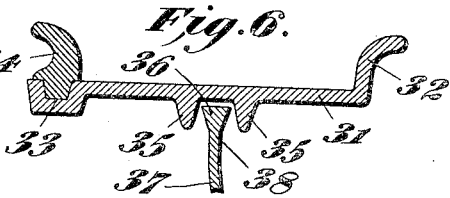

Fig. 4 is a slight modification of my invention in which the flange on one side is shorter or of less depth than the other in order that the rim may be more easily placed over the disk with less or no heating in the first instance or less upsetting in case the upsetting process is used. Fig. 5 shows the rim flange of Fig. 4 bent against the flange or protuberance of the disk to lock the rim and disk securely together. Fig. 6 is a cross sectional elevation of a portion of a rim and adjacent portions of the disk, the rim having two flanges and the disk having a beveled or dovetail-shape protuberance on its edge portion; and Fig. 7 is a cross section corresponding to Fig. 6 but with the flanges rolled down over the edges of the disk and also showing a portion of a pneumatic tire in position.

Referring now to the characters of reference on the drawings:—1 represents the wheel in general, 2 the hub portion thereof which is provided with enlarged flange portions 3 and a web portion 4 adjacent thereto, this hub being adapted to fit over another inner hub mounted on the usual roller bearings or otherwise on the axle of an automobile truck, or other vehicle, and be secured thereto by a nut or other clamping mechanism on the interior thereof not illustrated. 5 are rivets which secure the hub to the disk web and for solidity of construction I may use a reinforcing angle 6 on the outer side of the disk, as illustrated. I also provide a plurality of holes 7 which are adapted to fit over corresponding dowel pins or studs, which project from the interior hub in order to secure the two hubs together for driving purposes so that they revolve as one.

Referring to Figs. 1 and 2:—The rim portion is indicated generally as 8, one edge portion of which is bent as at 9 to secure one side of a clencher tire and the rim is provided with a portion 10, having a circumferential recess adapted to receive the side ring 11 to secure the other side of the tire. In this case the integral inwardly projecting flanges of the rim are 12, the outer portion of the body of the web disk is 16, provided with a protuberance 14 of bulb form, the disk in general being indicated as 15, the inner edge of the disk which is secured to the hub being 17.

Referring now to Fig. 3:—This is in some respects slightly different from that illustrated in Fig. 2, but the central portion thereof is the same as that in Fig. 2 except that the rim has been contracted upon the disk 15 and the flanges 12 are turned down against the same and now illustrated as 13. For the purpose of completeness of illustration, Fig. 3 shows locking rings on each side of the rim which are adapted to be turned as customary for either clencher or straight-side tires, the one on the left-hand side of this figure being illustrated as 20, the one on the right-hand side being 22, the flange of the rim adjacent to the latter being 21 and the groove to receive the other ring being 19, the rim in general being indicated as 18.

Referring now to Fig. 4:—This shows a slightly different type of rim which is indicated generally as 23, provided with a short flange or lug 24 and an opposing longer flange 25, whereas the disk is provided with a protuberance or flange-portion 26, the outer portion of the disk being 27 and the disk in general 28. After the disk and rim are assembled as illustrated in Fig. 4, the flange 25 is turned down, and is illustrated as 30 in Fig. 5, whereas the shorter lug 24 may also be hammered or rolled down to insure close contact with the said disk, as illustrated at 29, thereby locking the disk and rim very securely.

Referring now to Fig. 6, the rim in general is 31, the outer edge thereof adapted for straight-side tires being 32, the other side being provided with a groove-portion 33 adapted to receive the side ring 34, the inner surface of the rim being provided with inwardly projecting flanges 35, which are adapted to be rolled down upon the beveled or dovetail-shaped protuberance 36 provided on the edge of the web of the disk, the outer portion of which is 38, the disk itself in general being indicated as 37.

As illustrated in Fig. 7, these flanges 35 are hammered or rolled down to the form shown as 39, thereby locking the disk and rims securely together.

In all of the designs shown, circumferential laterally projecting portions on the disks coöperate to be interlocked with or abut against the inwardly extending flanges or projections on the rims, thereby insuring a simple, strong and rigid wheel construction.

It should be noted that the wheel disk may be made parallel or of uniform thickness, or it may be of greater thickness near the center and thence tapering to a less thickness at its circumference, thereby disposing the material in such a way as to adapt it to the stresses to which it is subjected. On account of the flare or dish-shape of a disk of this kind, it has a certain amount of spring or resiliency adapted to gradually take up the shocks of use and thereby prolong the life of the tires and save the vehicle from unnecessary shocks and rattling.

Although I have described and illustrated my invention in considerable detail, I do not wish to be limited to the exact and specific details thereof, as shown and described, but may use such modifications in, substitutions for, or equivalents thereof, as are embraced within the scope of my invention, or as pointed out in the claims.

Having thus described my invention, what I claim and desire to secure by Letters Patent is:—

1. A wheel comprising a thin disk provided with integral circumferential laterally projecting portions, a rim mounted thereon and provided with a pair of integral flanges formed intermediately of the edges of said rim and adapted to contact with said laterally projecting portions, thereby locking the rim and the disk securely together.

2. A wheel comprising a thin disk provided with integral circumferential laterally projecting portions, a rim mounted thereon and provided with a pair of intermediate flanges contacting with said laterally projecting portions on opposite sides of the disk.

3. A wheel comprising a thin disk provided with an integral circumferential laterally projecting portion, a rim provided with a pair of inwardly extending projections spaced apart intermediately of the edges of said rim, one of said projections contacting with the peripheral portion of the disk and the other contacting and conforming with said laterally projecting portion, thereby locking the rim and disk securely together.

4. A wheel comprising a thin disk provided with integral laterally projecting portions on its outer circumference, a rim provided with a pair of integral inwardly projecting flanges spaced apart intermediately of the edges of said rim, said flanges being conformed to and in contact with said laterally projecting portions, thereby locking the rim and disk securely together.

5. A wheel comprising a dished disk of tapering section thicker at its center and with integral circumferential lateral projecting portions, a rim provided with a pair of inwardly projecting flanges spaced apart intermediately of the edges of said rim and bent into contact with and conforming to said laterally projecting portions, thereby locking the rim and disk securely together.

6. A wheel comprising a dished disk of tapering section thicker at its center and having integral circumferential laterally projecting portions, a rim provided with a pair of inwardly projecting flanges spaced apart intermediately of the edges thereof, said flanges being bent into contact with and conformed to said laterally projecting portions, thereby locking the rim and disk together, and flanges extending outwardly from the edges of said rim adapted to secure and hold a pneumatic tire thereon.

In witness whereof I hereunto affix my signature.

EDWIN E. SLICK.